United States Patent [19]
Sullivan

[11] 3,906,309
[45] Sept. 16, 1975

[54] OVERCURRENT SENSOR

[75] Inventor: James F. Sullivan, Stow, Mass.

[73] Assignee: Honeywell Information Systems, Inc., Waltham, Mass.

[22] Filed: Jan. 15, 1974

[21] Appl. No.: 433,595

[52] U.S. Cl............ 317/18 R; 317/33 R; 317/33 C; 317/36 TD; 317/49
[51] Int. Cl.² .......................................... H02H 3/08
[58] Field of Search............ 317/18 R, 22, 30, 33 R, 317/36 TD, 38, 49, 14 TS; 323/9, 56, 57, 2; 340/253 R, 253 A

[56] References Cited
UNITED STATES PATENTS

| | | | |
|---|---|---|---|
| 3,308,345 | 3/1967 | Warrington | 317/18 R |
| 3,619,723 | 11/1971 | Walden | 317/18 R |
| 3,657,605 | 4/1972 | Hill | 317/49 |

OTHER PUBLICATIONS

C. E. Schroeder, "Electric Shock Prevention Device," Aug., 1959, Vol. 2, No. 2.

Primary Examiner—J. D. Miller
Assistant Examiner—Patrick R. Salce
Attorney, Agent, or Firm—Ronald T. Reiling

[57] ABSTRACT

An electrical circuit for sensing an overcurrent condition in another electrical circuit utilizing a transformer pickup. A transistorized Darlington pair is provided to isolate the pickup transformer from the fault sense circuitry, so that only a true overcurrent, and not merely a high change in current per unit time or a voltage spike, will cause the sense circuit to shut down the circuit under test.

16 Claims, 4 Drawing Figures

OVERCURRENT SENSOR

BACKGROUND OF THE INVENTION

1. Field of the Invention

This invention relates generally to electrical circuits and more particularly to apparatus for monitoring current through the circuit and causing the circuit to shut down if the apparatus senses current above a designated cut-off value. The overcurrent sensor finds particular utility in conjunction with monitoring overcurrent in a power supply.

2. Description of the Prior Art

Some methods for sensing for overcurrent in an electrical circuit are known in the prior art. In particular, methods are known which employ low-dissipative magnetic pickup elements, such as a secondary of a transformer, so that the power loss is small when the circuit under test is operated at high operating currents. See for example, patent application Ser. No. 320,041 filed on Jan. 2, 1973, entitled "High Current, Regulated Power Supply With Fault Protection," and patent application Ser. No. 320,047, filed on Jan. 2, 1973, entitled "Multivoltage, Regulated Power Supply With Fault Protection," both assigned to the assignee of the present invention. However, these circuits are responsive to high values of di/dt (i.e., rate of change of current with respect to unit time) and to extraneous noise (in the form of voltage spikes) on the circuit, as well as to high values of current. What is needed is an overcurrent sensing device for an electrical circuit which will distinguish between large values of current and merely high values of $di/dt$ or extraneous noise in the circuit.

OBJECTS

It is, therefore, an object of the present invention to provide an improved overcurrent sensor.

It is a further object of the present invention to provide for sensing for overcurrent in a power supply.

It is a still further object of the present invention to provide an improved low-dissipative pickup for sensing for overcurrent in an electrical circuit.

It is another object of the present invention to provide apparatus which protects the power train and load of a power supply.

It is still another object of the present invention to provide apparatus which allows for normal operation of an electrical circuit when high values of $di/dt$ or spurious voltage spikes pass through the circuit, but which disables the circuit for high values of current.

These and other features of the invention will be understood upon reading of the following description together with the drawings.

SUMMARY OF THE INVENTION

The aforementioned and other objects of the present invention are accomplished by providing isolation between the circuit which drives the overcurrent fault pickup transformer ("overcurrent transformer") and the circuit which senses for an overcurrent condition and relays this information to associated power shutdown circuitry. Isolation means are provided by a transistorized Darlington amplifier pair in a fault drive circuit. Sensing for overcurrent by a fault sense circuit is suspended by means of a one-shot circuit for a predetermined period of time, which in the preferred embodiment is 200 microseconds. The heart of the fault sense circuit is a voltage-to-voltage comparator. The one-shot circuit is tripped when driving a test current through one stage of the transformer causes the number of ampere turns in each stage of the transformer to be equal. If a true overcurrent condition is detected, an output signal is produced by the fault sense circuit. If, on the other hand, merely a high value of $di/dt$ or extraneous noise is present in the circuit, no output is produced by the fault sense circuit.

DESCRIPTION OF THE PREFERRED EMBODIMENT

Detailed Description of the Drawings

Figure 1:
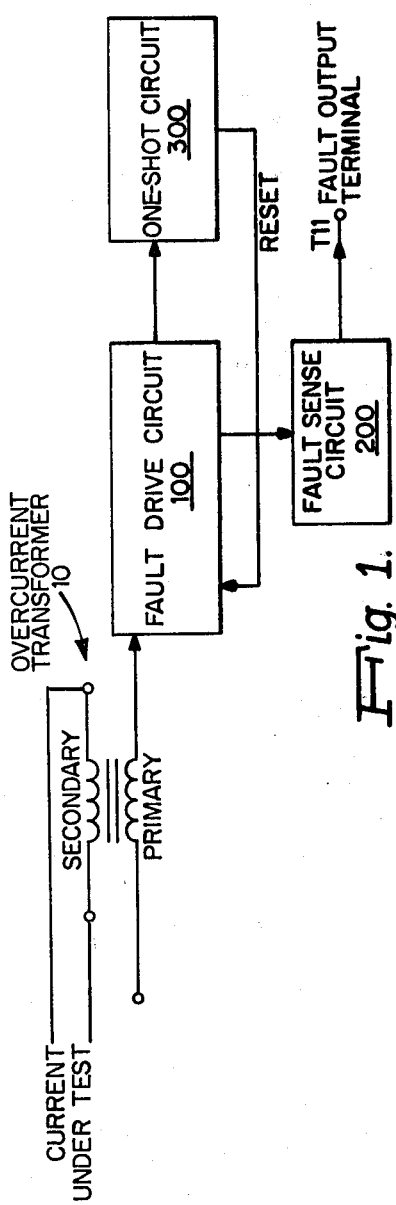
FIG. 1 is a block diagram of the invention.

Referring now to FIG. 1, transformer 10 (the "overcurrent transformer") is the pickup or sensing transformer which monitors for the overcurrent. The circuit operates on the theory of offsetting ampere turns in transformer 10. A current of triangular wave shape is driven through the primary to offset an ampere turns of the secondary. When these are offsetting (which occurs when the ampere turns are substantially equal), the voltage across the primary of the transformer is greatly and quickly increased due to the change in primary inductance as the core as it comes out of saturation. This voltage rise is sensed and triggers the operation of One-shot Circuit 300 which shuts off the drive current in the primary of the transformer for a predetermined period of time, which in the preferred embodiment is 200 microseconds. Ten ampere turns is normally run through the secondary so that the quiescent operating point is never on the knee of the BH loop. (The BH loop is a graph of magnetization as a function of flux density. The "knee" in FIG. 4 corresponds to the area to the immediate left of the No Load Quiescent Point, where B, the magnetization decreases rapid by. The knee is avoided so as to minimize the magnetizing inductance and transformer coupling during quiescent operation. An overcurrent through the secondary of transformer 10 is sensed in Fault Sense Circuit 200 by measuring the voltage on the emitter of the current source transistor feeding the primary. This current is directly proportional to the ampere turns in the primary. The corresponding voltage is compared against a preset voltage in the comparator of Fault Sense Circuit 200. The overcurrent reference value is adjustable from 40 amps to 220 amps in the preferred embodiment. This can be tested by means of test points on the board containing the circuit of the invention, to be easily manipulable by the operator.

One-shot Circuit 300 provides a predetermined period of time, which in the preferred embodiment is 200 microseconds, for the core of the overcurrent transformer to reset to its quiescent operating point. When a true overcurrent condition has been sensed, an output signal will be provided via Fault Output Terminal T11. This Signal can be used, for example, to disable the circuit under test. But if a true overcurrent condition has not been sensed, no fault signal will be generated.

Figure 2:
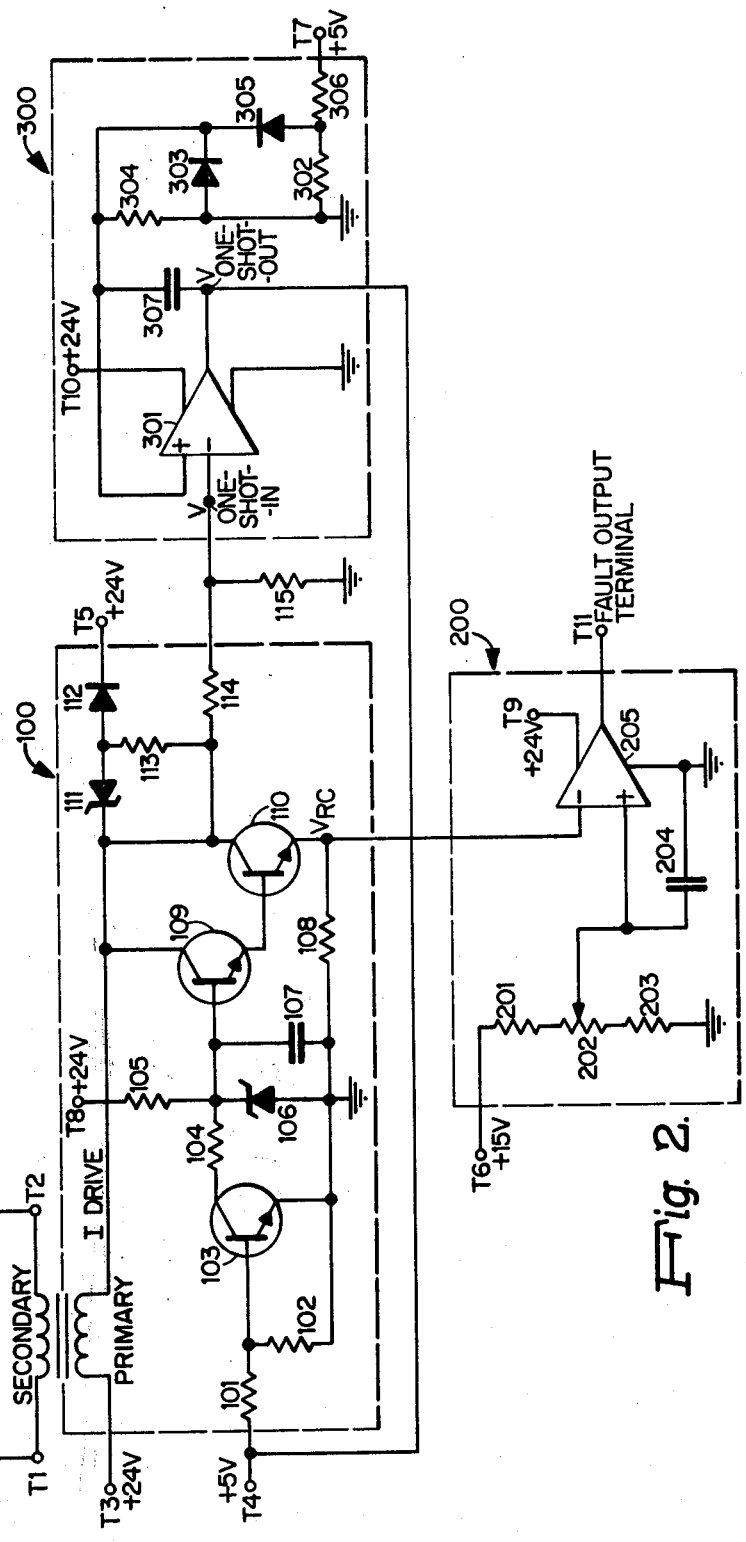
FIG. 2 is a schematic diagram of the invention.

Turning now to FIG. 2, which is a circuit diagram of the instant invention, we see that terminals T1 and T2 are connected to the secondary, or output, of overcurrent transformer 10. Terminal T3 is connected to one of the terminals of the primary, or input, stage of overcurrent transformer 10. Terminal T4, which is preferably connected to a +5V source by a resistor which is not shown, is connected through resistor 101 to the base of NPN transistor 103. One terminal of resistor 102 is connected to the base of transistor 103 and the other terminal of resistor 102 is connected to the emitter of transistor 103. The emitter of transistor 103 is connected through resistor 108 to the emitter of NPN transistor 110. Transistor 110 and resistor 108 constitute the current source for the primary of transformer 10. The collector of transistor 103 is connected through resistor 104 to the cathode of Zener diode 106, to one terminal of capacitor 107, and to the base of NPN transistor 109. Terminal T8 is connected to a +24V source. The other terminal of capacitor 107 and the anode of Zener diode 106 are connected to the emitter of transistor 103 and also to ground. The collector of transistor 109 is connected to the second terminal of the primary of overcurrent transformer 10, to the collector of transformer 110, to the cathode of Zener diode 111, and through resistor 113 to the anode of diode 112. The anode of Zener diode 111 is connected to the anode of diode 112, and the cathode of diode 112 is connected to terminal T5, which is connected to a +24V source. The collector of transistor 109 is also connected through resistor 114 to the negative input terminal of voltage comparator 301. Resistor 115 connects the negative input terminal of voltage comparator 301 of to ground. The positive input terminal of voltage comparator 301 is connected through capacitor 307 to the output terminal of voltage comparator 301, and through serially connected resistors 304, 302 and 306 to terminal T7. Terminal T7 is connected to a +5V source. Resistor 304 also connects the positive input terminal of voltage comparator 301 to ground and to the anode of diode 303. The cathode of diode 303 is connected to the positive input terminal of voltage comparator 301 and to the cathode of diode 305. The anode of diode 305 is connected to a terminal connecting resistor 302 to resistor 306. The power supply terminal of voltage comparator 301 is connected to terminal T10 which is connected to a +24V source. The terminal of voltage comparator 301 is connected to ground. The output terminal of voltage comparator 301 is also connected to terminal T4.

The emitter of transistor 110 is connected to the negative input terminal of voltage comparator 205. The supply terminal of voltage comparator 205 is connected to terminal T9, which is connected to a +24V source. The positive input terminal of voltage comparator 205 is connected through capacitor 204 to ground and to the common terminal of voltage comparator 205. The positive input terminal of voltage comparator 205 is also connected to the variable connection terminal of potentiometer 202. The output terminal of voltage comparator 205 is connected to terminal T11, the Fault Output Terminal. One terminal of potentiometer 202 is connected through resistor 203 to ground, and the other terminal of potentiometer 202 is connected through resistor 201 to terminal T6, which is connected to a +15V source.

In the following discussion, voltages indicated at various points and terminals of FIG. 2 are typical voltages, and other voltages could be used within the spirit and scope of the invention.

Figure 3:
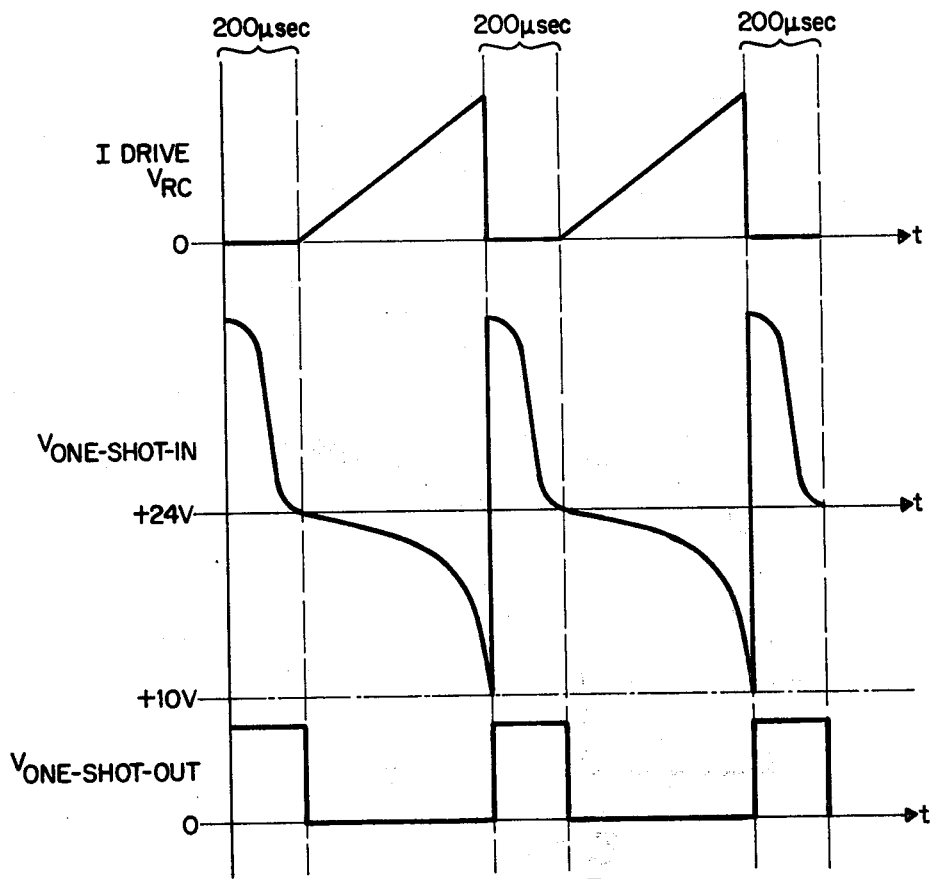
FIG. 3 is a set of time graphs showing values of voltage at relevant points in the circuit of the invention responsive to non-fault but input current values.

Let us turn now to FIG. 3, which illustrates certain voltages and current as a function of time. These voltages and current graphs correspond to points identically labelled on FIG. 2. For example, the first graph illustrates the driving current I drive through the primary of transformer 10 as a function of time. this graph also illustrates $V_{RC}$ as a function of time, since $V_{RC}$ is proportional to $I_{DRIVE}$. $V_{RC}$ is the voltage measured at the emitter of transistor 110. $V_{RC}$ is the output voltage of Fault Drive Circuit 100 which is used as the input voltage for Fault Sense Circuit 200. $I_{DRIVE}$ is the current driven through the primary, or input, stage of overcurrent transformer 10 by transistor 110 and resistor 108. We see that the second graph is a graph of FIG. 3 of the voltage at the input of One-shot Circuit 300, which can be measured at the negative input terminal of voltage comparator 301. As the current rises on the up ramp of $I_{DRIVE}$ through the overcurrent transformer, $V_{one\text{-}shot\text{-}in}$ deteriorates at a rate equal to the changing magnetizing inductance in the primary of transformer 10 as a function of time. When the ampere turns through the primary of transformer 10 fully offsets the ampere current through the secondary due to the test current, the magnetization of the core of the transformer is driven out of saturation. This causes a large voltage spike which is received at the input to the one-shot circuit 300, and the one shot circuit is triggered. As it does so, it turns off drive transistor 110, bringing the current to zero (which we note on the graph for $I_{DRIVE}$). The output voltage of the one-shot circuit, which can be measured at the output terminal of voltage comparator 301, then attains a constant level for a discrete period of time determined by the time constant of the RC networks within the one-shot circuit. This allows the core of the overcurrent transformer to reset to its full load quiescent operating point. At the end of this time, the one-shot circuit shuts off and current is allowed to build up once again through the primary of transformer 10, until either a fault is detected or the one-shot circuit is triggered.

Figure 4:
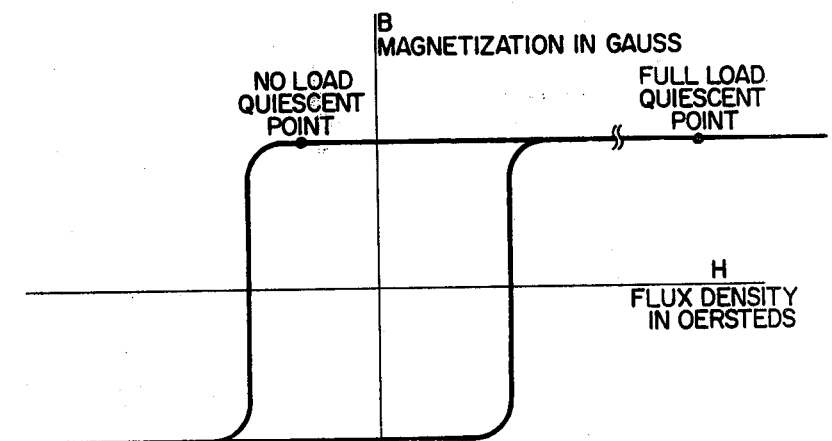
FIG. 4 is a graph of the magnetization of a typical transformer used in the invention as a function of flux density.

Turning now to FIG. 4, we see B (magnetization in Gauss) as a function of H (flux density in Oersteds) for a typical transformer used in the invention. A constant current is run through the secondary to insure that quiescent operation of the transformer is well away from the nonlinear portion of the curve. As the ampere turns in the primary become equal to the ampere turns in the secondary, (i.e. as $I_{DRIVE}$ is increased,) the core eventually comes out of saturation and the operating point (or magnetization of the cone) slips off the knee of the BH loop. In the non-linear operating region, the high rate of change of magnetization of the core causes a sudden high voltage rise across the primary of the transformer.

Operation of the Preferred Embodiment

The isolation between One-shot Circuit 300 and the Fault Sense Circuit 200 is provided by transistor 110 in Fault Drive Circuit 100. When the core of overcurrent transformer 10 is driven out of saturation into the nowlinear region, the one-shot, which is connected to the primary of transformer 10 through resistor 114, is triggered and sends a 200 microsecond reset pulse to Fault Drive Circuit 100. If, immediately prior to the firing of the one-shot, the voltage at the input to Fault Sense Circuit 200 is not high enough, there is no fault condition. If, on the other hand, the transformer drive current increases over the predetermined cutoff point without triggering the one-shot circuit (that the predetermined cutoff point is a function of the setting of potentiometer 202) due to an overcurrent in the current under test which requires a higher drive current to drive the core out of saturation, the voltage at the input of Fault Sense Circuit 200 will reach its fault condition prior to the firing of the one-shot. The fault (or overcurrent) will be detected by Fault Sense Circuit 200 and the source of the current under test may be shut off via a signal sent through Fault Output Terminal T11.

In prior art overcurrent circuits, the sense circuitry was associated directly with the overcurrent transformer. Therefore, any noise on the transformer, including high di/dt or other noise, was sent directly to the sense circuitry causing the power supply to shut down. In this circuit, on the other hand, there is isolation between the overcurrent transformer and the fault sense circuit. Furthermore, the primary and secondary of the overcurrent transformer act to offset one another. In this manner, a positive $di/dt$ acts merely to drive the transformer further into saturation, but does not trigger a fault signal. Any noise that happens to be on the overcurrent transformers at worst can only trigger the one-shot, not the fault sense circuit.

The fault sense circuit consists primarily of a conventional voltage comparator. For example, it can be one of the type known commercially by the name NATIONAL SEMICONDUCTOR LM 311, made in the form of integrated circuits. The comparator normally compares a voltage with a preset reference voltage. Since in the invention the comparison is to detect an overcurrent condition, there must be means for converting this current to a voltage. This is accomplished by the following method. In the preferred embodiment, there are 550 turns in the primary of the transformer and 1 turn in the secondary. Thus a 55 ampere current to the secondary would correspond to a 0.1 ampere current in the primary. By Ohm's law, E equals IR. In this case, the resistance in question is resistor 108, which drives the fault sense circuitry, which in the preferred embodiment is 15 ohms. Therefore, E equals IR equals 0.1 amp times 15 ohms equals 1.5 volts and thus a 55 ampere overcurrent in the secondary corresponds to a 1.5 volt reference which is preset in the comparator of the fault sense circuit. In the preferred embodiment, the invention is set to test for an overcurrent condition ranging from 40 amperes to 220 amperes.

The 200 microsecond delay requirement for the one-shot is determined by the amount of time required to reset the core of the overcurrent transformer and by the Et constant of the core itself. The Et constant, or saturation constant, is a function of the number of turns, voltage, internal core parameters, and time.

The output of Fault Sense Circuit 200 is signaled via terminal T11. This terminal can be connected to a device which will disable the circuit under test. The invention can be implemented in conjunction with other devices for shutting down the power supply in cases of undervoltage, over-voltage and over-temperature. These fault outputs can all be bussed together. The restarting of the circuit under test can be accomplished by any means, including manual means. The fault output signal can also light lights to indicate to the operator that the circuit has been shut down.

The fault drive circuit is driven by RC network consisting of capacitor 107 and resistor 108. Transistors 109 and 110 are connected in Darlington connection (that is, the emitter of the first is connected to the base of the second). When transistor 110 is "on," the current through resistor 108 can be limited to give a ramp of voltage on the emitter of transistor 110 depending upon the ramp of current to the collector of transistor 110. It should be noted that the collector current is proportional to the current through the primary transformer 10. Transistor 110 and resistor 108 can therefore be thought of as the current source for the primary of transformer 10.

The isolation between the one-shot circuit and the fault sense circuit is determined by the fact that the one-shot is connected directly to the collector of transistor 110 whereas the fault sense circuit is connected directly to the emitter of transistor 110. Therefore, any extraneous noise on the collector of transistor 110 is not passed to the emitter and hence to the fault sense circuit.

A ramp of current is driven through the primary of transformer 10 starting from zero and increasing until the ampere turns in the primary of transformer 10 one substantially equal to the ampere turns in the secondary. When they are offsetting, the one-shot is triggered, thereby turning off the drive transistor and bringing the drive current to zero. At the end of the 200 microseconds, the current again starts from zero ramping up until the ampere turns in the primary are once again equal to the ampere turns in the secondary or until a fault condition is detected.

In the preferred embodiment, the phasing of the overcurrent transformer is implemented in such a way that a negative current or a current moving in a negative direction is what trips the one-shot, so high $di/dt$ moving in a negative direction or a voltage spike will cause the voltage negative input of the one-shot circuit to rise. If this voltage hits the positive input level), the one shot will trigger. At that time, the one-shot allows the core of the transformer to reset, after which the fault sense circuit once again begins to search out the true level of current. If it is merely high $di/dt$ or a voltage spike which has tripped the one-shot, a fault condition will not be sensed. In the preferred embodiment, voltage spikes with frequencies greater than 100 Kc will not trip the one-shot because they will be swamped by the high leakage inductance of the transformer.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed within the spirit and scope of the invention.

What is claimed is:

1. Apparatus for sensing an overcurrent in an electrical circuit comprising:
    a transformer having a secondary and a primary winding with a test current from said electrical circuit being passed through said secondary winding;
    drive means coupled to the primary winding of the transformer for driving a continuously increasing drive current through said primary winding;

sense means coupled to said drive means for measuring said drive current and thereby sensing whether an overcurrent condition in said secondary winding exists; and, reset means coupled to said drive means and to said transformer for generating a signal for resetting said drive means and for providing a predetermined period of time for the core of the transformer to reset.

2. Apparatus of claim 1 further comprising signaling means coupled to said sense means and responsive to said sense means for transmitting a signal to associated circuitry when an overcurrent condition is sensed.

3. Apparatus of claim 1 wherein isolation means are provided within said drive means and coupled to said sense means and said reset means for providing isolation between said sense means and said reset means.

4. Apparatus of claim 3 wherein said isolation means comprises a transistor.

5. Apparatus of claim 1 wherein said reset means comprises a one-shot circuit.

6. Apparatus of claim 1 wherein said sense means comprises a comparator for comparing said drive current with a reference voltage and signaling means coupled to said comparator for signaling to associated circuitry the presence of an overcurrent in said electrical circuit.

7. Apparatus of claim 1 wherein said reset means is responsive to the number of ampere turns in the primary winding of the transformer being equal to the number of ampere turns in the secondary winding of the transformer.

8. An improved method for sensing an electrical overcurrent of the type comprising the steps of passing the current being sensed to the secondary winding of the transformer having a secondary and a primary winding and sensing the presence of an overcurrent condition by means of a sensing circuit coupled to said primary winding wherein the inprovement comprises:

driving a continuously increasing test voltage through said primary winding;

resetting said test voltage when the number of ampere turns in the primary winding of the transformer equals the number of ampere turns in the secondary winding so that the voltage across the transformer is greatly and quickly increased;

triggering a one-shot circuit in response to the increased voltage, which gives the core of the transformer a predetermined time in which to reset;

sensing the test current which is proportional to said current being passed through said secondary winding; and transmitting a signal to associated circuitry when an overcurrent condition has been detected.

9. A method for determining whether an overcurrent is passing through a wire comprising the steps of:

connecting the wire to a secondary winding of a transformer having a secondary and primary winding, driving a continuously increasing test current through the primary winding of the transformer;

resetting said test current whenever the number of ampere turns in the primary winding of the transformer equals the number of ampere turns in the secondary winding;

converting said test current into a proportional test voltage; and comparing said test voltage to a variable reference voltage, thereby determining the presence of an overcurrent whenever said test voltage exceeds said reference voltage.

10. Apparatus for sensing an overcurrent in an electrical circuit comprising:

transformer having a secondary and primary winding with a test current from said electrical circuit being passed through said secondary winding;

drive means coupled to the primary winding of the transformer for driving a continuously increasing drive current through said primary winding, said drive means including a pair of transistors connected emitter-tobase, a resistor, and a capacitor;

sense means coupled to said drive means for sensing whether an overcurrent condition in the secondary winding of the transformer exists comprising a comparator for comparing said drive current with a reference voltage; and, reset means coupled to said drive means and to said transformer for generating a reset signal of predetermined duration which shuts off said drive current and thereby provides a predetermined period of time for the core of said transformer to reset.

11. The apparatus of claim 10 wherein said reset means are responsive to the number of ampere turns in the primary winding of the transformer being equal to the number of ampere turns in the secondary winding.

12. The apparatus of claim 11 wherein said sense menas further comprises signaling means for signaling to associated circuitry the presence of an overcurrent in the circuit under test.

13. The apparatus of claim 12 further comprising isolation means within said drive means and coupled to said sense means and said reset means for providing isolation between said sense means and said reset means.

14. Apparatus of claim 13 wherein said isolation means comprises one of said pair of transistors.

15. Apparatus of claim 14 wherein the emitter of said one transistor is connected directly to said sense means and the collector of said one transistor is connected directly to said reset means.

16. Apparatus for sensing an overcurrent in an electrical circuit comprising:

a transformer having a secondary and primary winding with a test current from said electrical circuit being passed through said secondary winding;

drive means coupled to the primary winding of said transformer for driving a continuously increasing drive current through said primary winding comprising a pair of transistors connected emitter-to-base, resistor, and a capacitor;

sense means coupled to said drive means for sensing whether an overcurrent condition in said secondary winding exists, said sense means including a comparator coupled to said drive means for comparing said drive current with a reference voltage and signalling means coupled to the ouput of said comparator and to associated circuitry for signalling said associated circuitry the presence of an overcurrent in said secondary winding;

reset means coupled to said drive means and to said transformer, said reset means responsive to the number of ampere turns in said being equal to the number of ampere turns in said first stage, said reset means providing a predetermined period of time for the core of the transformer to reset, said reset means comprising a one-shot circuit; and isolation means within said drive means and coupled to said sense means and to said reset means for providing isolation between said sense means and said reset means, said isolation means comprising one of said pair of transistors.

* * * * *

UNITED STATES PATENT OFFICE
CERTIFICATE OF CORRECTION

PATENT NO. : 3,906,309
DATED : September 16, 1975
INVENTOR(S) : James F. Sullivan It is certified that error appears in the above-identified patent and that said Letters Patent are hereby corrected as shown below:

IN THE CLAIMS

Claim 8, line 39, change "inprovement" to --improvement--.

Claim 10, line 14, change "emitter-tobase" to --emitter-to-base--.

Claim 16, line 66, after "said" insert --primary winding--.

Claim 16, line 67, delete "first stage" and substitute therefor --secondary winding--.

Signed and Sealed this ninth Day of December 1975

[SEAL]

Attest:

RUTH C. MASON
Attesting Officer

C. MARSHALL DANN
Commissioner of Patents and Trademarks